(12) United States Patent
Lotzenburger et al.

(10) Patent No.: US 9,128,690 B2
(45) Date of Patent: Sep. 8, 2015

(54) BUS PIN REDUCTION AND POWER MANAGEMENT

(71) Applicants: Texas Instruments Incorporated, Dallas, TX (US); Texas Instruments Deutschland GMBH, Freising (DE)

(72) Inventors: Lars Lotzenburger, Erding (DE); Lothar K Felten, Hauset (BE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 245 days.

(21) Appl. No.: 13/625,316

(22) Filed: Sep. 24, 2012

(65) Prior Publication Data

US 2014/0089686 A1 Mar. 27, 2014

(51) Int. Cl.
G06F 13/00 (2006.01)
G06F 1/00 (2006.01)
G06F 1/26 (2006.01)

(52) U.S. Cl.
CPC ........................................ *G06F 1/266* (2013.01)

(58) Field of Classification Search
CPC .................................. H02M 3/07; G06F 1/26
USPC .................................. 713/300–340; 710/110
See application file for complete search history.

(56) References Cited

U.S. PATENT DOCUMENTS

| | | | | |
|---|---|---|---|---|
| 3,665,222 A * | 5/1972 | Gatwood | ....................... | 327/300 |
| 4,140,964 A * | 2/1979 | Eubank et al. | ................ | 324/551 |
| 4,547,853 A * | 10/1985 | Eckert | ........................... | 705/405 |
| 5,204,896 A * | 4/1993 | Oliver | ....................... | 379/106.04 |
| 5,671,131 A * | 9/1997 | Brown | ........................... | 363/49 |
| 6,049,724 A * | 4/2000 | Rozenblit et al. | ............. | 455/572 |
| 6,125,047 A * | 9/2000 | Janz | ................................... | 363/60 |
| 6,157,168 A * | 12/2000 | Malik | ........................... | 320/128 |
| 6,285,521 B1 * | 9/2001 | Hussein | ..................... | 360/73.03 |
| 7,886,259 B2 * | 2/2011 | Rius Vazquez et al. | ....... | 716/120 |
| 8,699,291 B1 * | 4/2014 | Ch'ng et al. | .................. | 365/226 |
| 2001/0043060 A1 * | 11/2001 | Brandt | ........................... | 323/282 |
| 2002/0171462 A1 * | 11/2002 | Sekimoto et al. | ............. | 327/143 |
| 2004/0036450 A1 * | 2/2004 | Aiello et al. | .................. | 323/222 |
| 2005/0024090 A1 * | 2/2005 | Terletzki et al. | ................ | 326/87 |
| 2007/0112990 A1 * | 5/2007 | Hayashita | ..................... | 710/305 |
| 2008/0180157 A1 * | 7/2008 | Choi et al. | ..................... | 327/384 |
| 2008/0311861 A1 * | 12/2008 | Lepek | ............................. | 455/73 |
| 2009/0051414 A1 * | 2/2009 | Pahr | ............................. | 327/536 |
| 2009/0253495 A1 * | 10/2009 | Loose et al. | .................... | 463/25 |
| 2013/0015828 A1 * | 1/2013 | Amir | ............................. | 323/281 |
| 2013/0162226 A1 * | 6/2013 | Su et al. | ........................ | 323/234 |

FOREIGN PATENT DOCUMENTS

| | | | | | |
|---|---|---|---|---|---|
| CN | 102868198 | A | * | 1/2013 | ............... H02J 7/00 |
| CN | 203554386 | U | * | 4/2014 | ............... H03F 1/02 |

* cited by examiner

*Primary Examiner* — Faisal M Zaman
(74) *Attorney, Agent, or Firm* — John R. Pessetto; Charles A. Brill; Frank D. Cimino

(57) ABSTRACT

A reduced-pin bus system includes a bus having one or more signal lines that are coupled to a bus power supply through a current limiting device. A master unit is coupled to the bus and is arranged to transmit communications across the bus during an active period of the bus and to initiate communications during (and/or at the end of) a quiescent period of the bus. A slave unit is coupled to the bus and is arranged to couple power from the one or more signal lines to a capacitor during the quiescent period of the bus and to consume power from the capacitor during the active period of the bus.

17 Claims, 5 Drawing Sheets

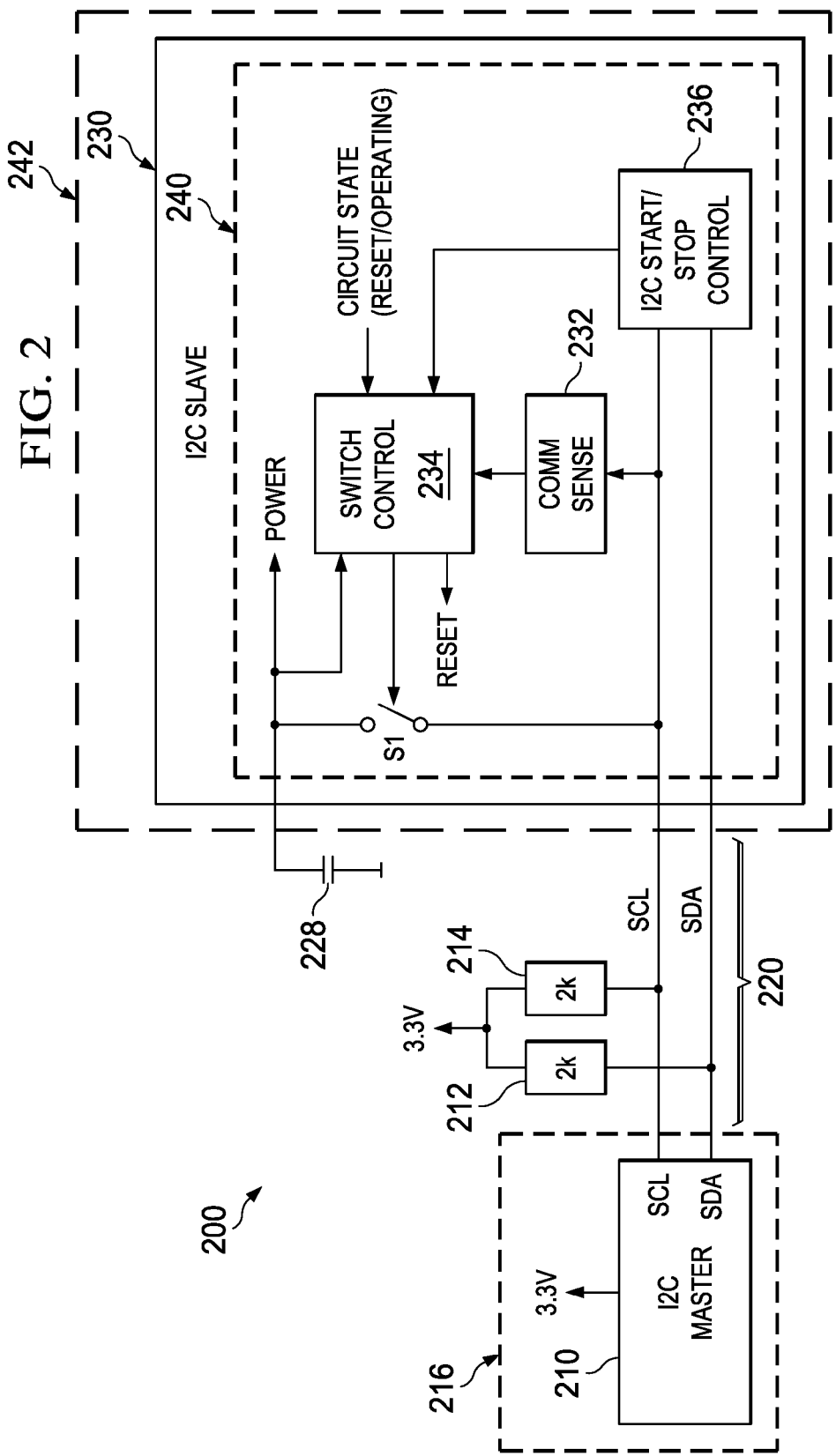

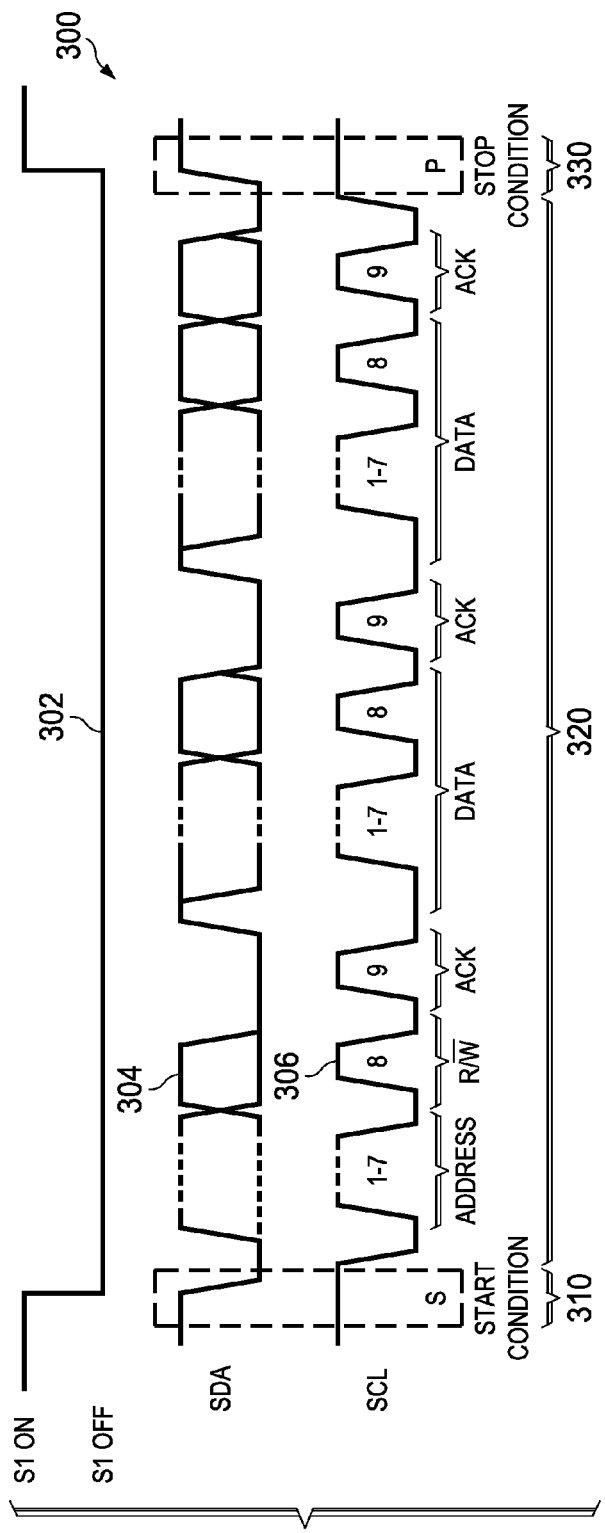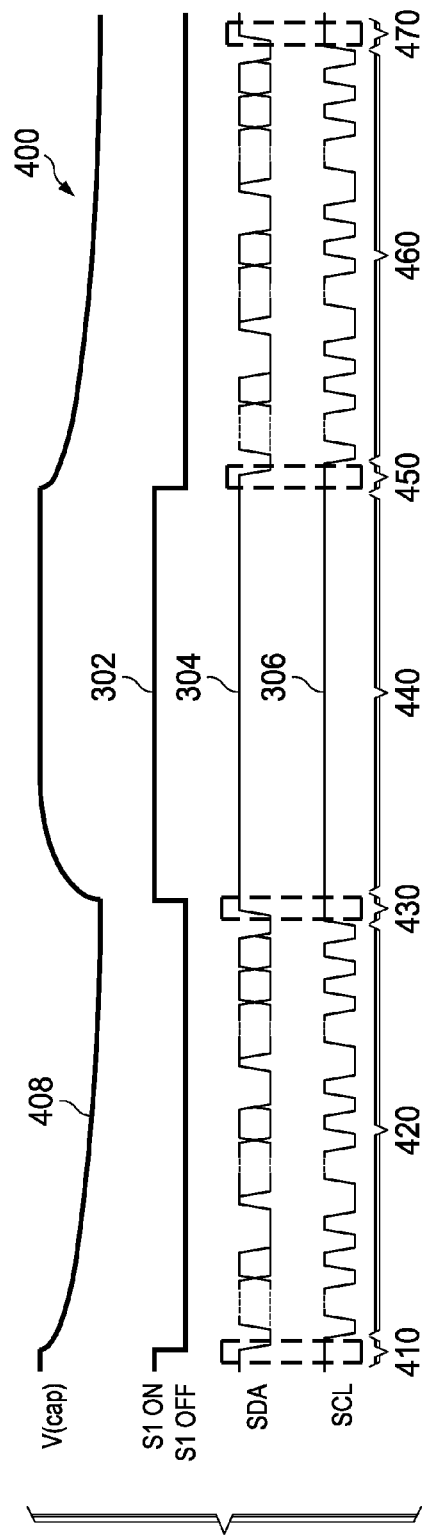

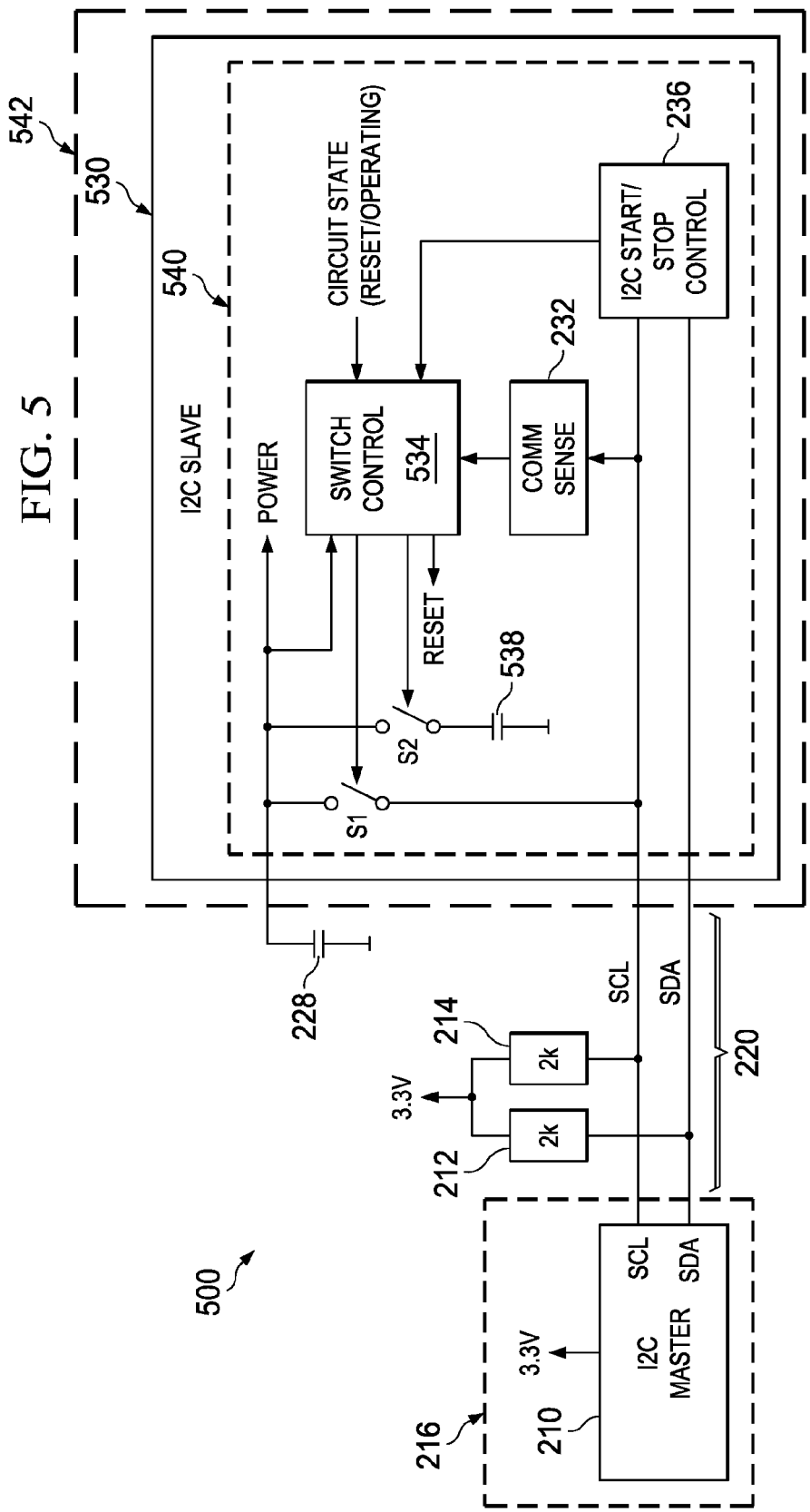

BUS PIN REDUCTION AND POWER MANAGEMENT

BACKGROUND

Buses (such as serial buses) are often used in applications where pin counts (such as the number of inputs and outputs that use a dedicated terminal) of devices are limited. An example of a serial bus that is used for such applications is the I2C (inter-integrated circuit) bus. The I2C bus is a multi-master bus that typically includes a maximum of two signal lines such as a serial clock line (SCL) and a serial data (SDA) line that are used to provide communications between a bus master unit and a bus slave integrated unit. However, despite the functionality provided by the minimized pin-count bus, other terminals and pins are often required by the slave unit (for example) to provide power and control logic for the slave unit.

SUMMARY

The problems noted above are solved in large part by a power control manager for a bus unit that reduces pin requirements. As disclosed herein, pin requirements are reduced by using a signal line from the bus for providing both power and control of the bus unit. Using the signal line from the bus for providing both power and control of the bus unit allows a control pin and a power pin to be eliminated from the bus unit (for example), and does not affect normal operation of the bus used to power and control the bus unit. Additionally, the need for wiring (including wiring such as traces) that would otherwise be required for coupling the eliminated pins is obviated.

The reduced-pin bus system typically includes a bus having a first and a second signal line that are respectively coupled to a bus power supply through a current limiting device (such as a resistor). A master unit is coupled to the bus and is arranged transmit communications across the bus during an active period of the bus. The master unit is able to initiate the communications during (and/or at the end of) a quiescent period of the bus. A slave unit is coupled to the bus and is arranged to couple power from the first (and/or second) signal line to a capacitor during the quiescent period of the bus and to consume power from the capacitor during the active period of the bus.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a logic diagram illustrating a bus system incorporating combined power and control functions in accordance with preferred embodiments of the disclosure;

FIG. 3 is a timing diagram illustrating a bus system incorporating combined power and control functions in accordance with preferred embodiments of the disclosure;

FIG. 4 is a timing diagram illustrating the charging of a bus system incorporating combined power and control functions in accordance with preferred embodiments of the disclosure;

FIG. 5 is a logic diagram illustrating a bus system incorporating a two-capacitor system having combined power and control functions in accordance with preferred embodiments of the disclosure.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
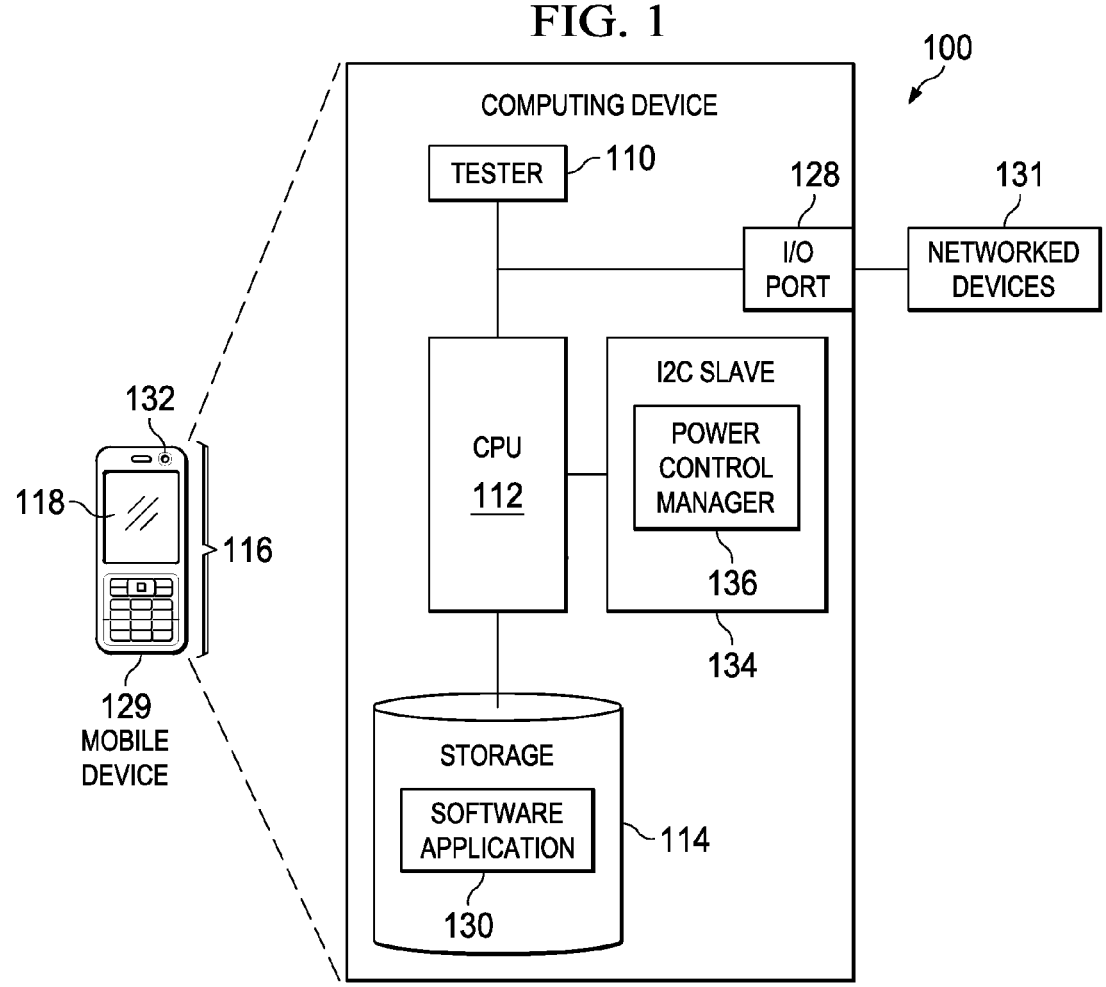
FIG. 1 shows an illustrative computing device in accordance with preferred embodiments of the disclosure.

FIG. 1 shows an illustrative computing device 100 in accordance with preferred embodiments of the disclosure. For example, the computing device 100 is, or is incorporated into, a mobile communication device 129, such as a mobile phone, a personal digital assistant, a personal computer, automotive electronics, projection (and/or media-playback) unit, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as on-processor cache, off-processor cache, RAM, flash memory, or disk storage) stores one or more software applications 130 (e.g., embedded applications) that, when executed by the CPU 112, perform any suitable function associated with the computing device 100. The CPU 112 can include (or be coupled to) 12C (inter-integrated circuit) slave 134, which is normally arranged in a separate substrate from the substrate of CPU 112 (which can be arranged as an I2C master). I2C slave 134 is coupled to an I2C master and includes a power control manager 136 that is arranged to derive operational power and control information from the I2C bus.

The tester 110 is a diagnostic system and comprises logic (embodied at least partially in hardware) that supports monitoring, testing, and debugging of the computing device 100 executing the software application 130. For example, the tester 110 can be used to emulate one or more defective or unavailable components of the computing device 100 to allow verification of how the component(s), were it actually present on the computing device 100, would perform in various situations (e.g., how the components would interact with the software application 130). In this way, the software application 130 can be debugged in an environment which resembles post-production operation.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, image projector 132, and the like. The input is received using audio and/or video inputs (using, for example, voice or image recognition), and mechanical devices such as keypads, switches, proximity detectors, and the like. The CPU 112 and tester 110 is coupled to I/O (Input-Output) port 128, which provides an interface (that is configured to receive input from (and/or provide output to) peripherals and/or computing devices 131, including tangible media (such as flash memory) and/or cabled or wireless media (such as a Joint Test Action Group (JTAG) interface). These and other input and output devices are selectively coupled to the computing device 100 by external devices using wireless or cabled connections.

As disclosed herein, a reduced-pin bus system includes a bus having a first signal line that is coupled to a bus power supply through a current limiting device. A master unit is coupled to the bus and is arranged transmit communications across the bus during an active period of the bus and to initiate communications during (and/or at the end of) a quiescent period of the bus. A slave unit is coupled to the bus and is arranged to couple power from the first signal line to a capacitor during the quiescent period of the bus and consume power from the capacitor during the active period of the bus.

FIG. 2 is a logic diagram illustrating a bus system incorporating combined power and control functions in accordance with preferred embodiments of the disclosure. Bus system 200 is illustrated as an inter-integrated circuit (I2C) bus system having an inter-integrated circuit master 210, an inter-integrated circuit bus 220, and an inter-integrated circuit slave 230. Inter-integrated circuit master 210 is typically arranged on a first substrate 216, from which power for the inter-integrated circuit master 210 is provided.

Inter-integrated circuit master 210 is coupled to an inter-integrated circuit bus 220 via the serial clock line (SCL) and a serial data (SDA) line in accordance with the inter-integrated circuit bus standard. The serial clock line (SCL) and a serial data (SDA) line are normally arranged in an open drain configuration and are respectively coupled to system power via current-limiting devices such as pull-up resistors 212 and 214. The inter-integrated circuit bus 220 is typically arranged between a first substrate 216 and a second substrate 242 to couple communications from circuits formed in differing substrates.

The inter-integrated circuit slave 230 is typically arranged on the second substrate 242 and is a pin-limited circuit such that total number of pins, terminals, I/O pads, and the like is minimized to conserve resources around the boundary of the inter-integrated circuit slave 230. In accordance with the present disclosure, inter-integrated circuit slave 230 derives power for the active circuitry of the inter-integrated circuit slave 230 is provided from one or more bus signals that are coupled to system power via one or more respective pull-up resistors. Deriving power from the bus signals (via resistors 212 and/or 214) allows the inter-integrated circuit slave 230 to not have a dedicated power pin.

Additionally, the amount of power provided by the one or more bus signals is used to change an operating condition of the inter-integrated circuit slave 230. For example, "starving" the inter-integrated circuit slave 230 of power can be used to initiate the resetting of the inter-integrated circuit slave 230 (which allows the inter-integrated circuit slave 230 to not have a dedicated reset pin). Accordingly, the use of two pins (or other types of terminals) that would otherwise be provided to couple power to and control the active circuitry of the inter-integrated circuit slave 230 is avoided.

In operation, the inter-integrated circuit start/stop control 236 of the inter-integrated circuit slave 236 is arranged to determine whether the inter-integrated circuit bus 220 is operating in an active mode or a quiescent mode. During the quiescent mode, the power control manager 240 (which is a power control manager such as power control manager 136) is arranged to charge capacitor 228. Capacitor 228 is arranged having a ground lead that is coupled to system ground and a power lead that is coupled to the positive rail (for example) of the inter-integrated circuit slave power distribution system that is arranged to supply circuits arranged in the substrate of the second substrate 242.

During the active mode, the capacitor 228 is arranged to supply power to the active circuitry of the inter-integrated circuit slave 230. The capacitor 228 can be physically mounted on the substrate 242 or formed within substrate 242 such that an I/O (input and/or output) pad, pin, or terminal is not necessarily required to couple the capacitor to the power input of the inter-integrated circuit slave 230. Likewise, a ground pad, pin, or terminal around the boundary of the substrate 242 is similarly not necessarily required to charge (or discharge) the capacitor 228.

In the quiescent mode (e.g., when no bus communications are currently active), communication ("comm") sense 232 unit senses that a bus line (such as SCL, as illustrated in FIG. 2) is "pulled" high (for example, by resistors 212 and/or 214. Closing switch S1 couples power from the power supply through the pull-up resistors 212 and/or 214 to the capacitor 228. The pull-up resistors limit the instantaneous current flow to the capacitor 228, which lowers electromagnetic interference (EMI), ground bounce, instantaneous power requirements, and the like.

Switch S1 is arranged to be actuated (e.g., open and closed) by switch control 234. In response to a determination that the bus line is high (and the bus is in quiescent mode), switch control 234 is arranged to close switch S1. Switch control 234 is also arranged to close switch S1 in response to an indication from inter-integrated circuit start/stop control 236 that the bus is entering (or is in) the quiescent mode. Likewise the inter-integrated circuit slave 230 optionally contains state logic (including latches, clocks, counters, state machines, and the like) that are used to control the closing of switch S1.

Switch S1 is opened to decouple the (stored charge of the) capacitor from the signal line to permit normal communications over the signal line during the active mode. Accordingly, the switch control 234 is arranged to open switch S1 when the communication sense 232 unit senses that the serial clock line (SCL), for example, is pulled low, which indicates the start of the active mode. Likewise, inter-integrated circuit start/stop control 236 is arranged to (in conjunction with or separately from communication sense 232 unit) open switch S1 when the serial clock line (SCL), for example, is pulled low, which indicates the start of the active mode. Functions of the communication sense 232 unit can be performed in part or in the entirety by inter-integrated circuit start/stop control 236.

As discussed above, the amount of power provided by the one or more bus signals is used to control resetting of the inter-integrated circuit slave 230 (which allows the inter-integrated circuit slave 230 to not have a dedicated reset pin). The inter-integrated circuit master 210 is arranged to "force" a reset of inter-integrated circuit slave 230 by "starving" the inter-integrated circuit slave 230 of power by limiting the amount of time spent in quiescent mode.

The amount of time spent in quiescent mode can be limited by repeatedly requesting bus transfers across inter-integrated circuit bus 220, which forces the inter-integrated circuit bus 220 into an active mode (where power is consumed by inter-integrated circuit slave 230) rather than storing power (where switch S1 is closed in the quiescent mode). Thus, a length of time for the quiescent mode is selected such that the capacitor stores sufficient charge during the quiescent periods to avoid a brown-out condition when a reset (for example) is not desired for the inter-integrated circuit slave. Similarly, the length of time for quiescent mode is can be selected such that the capacitor stores insufficient charge to operate during the active period and a brown-out condition is intentionally encountered (which forces a reset, for example).

Power control unit 234 is arranged to monitor the power (e.g., by measuring the voltage) of capacitor 228. When the available power (e.g., measured as instantaneous voltage) drops down to (or is maintained in) a threshold that defines a "brown out" condition, power control unit 234 is arranged to assert a reset signal for resetting the inter-integrated circuit slave 230. Thus the inter-integrated circuit slave 230 can be reset externally without requiring the use of dedicated pin (or other type of terminal) to receive an external reset command. Accordingly, the use of two pins (such as power and reset) that would otherwise be provided to couple power to and control the active circuitry of the inter-integrated circuit slave 230 is avoided through use of the power and control manager 240.

When the power control unit 234 is arranged to assert a reset signal for resetting the inter-integrated circuit slave 230, the inter-integrated circuit slave 230 is powered up (from a power-starved state) in a controlled manner. The inter-integrated circuit start/stop control 236 is powered during high periods of serial clock (SCL) signal 306 and/or serial data (SDA) signal 304 (without draining too much power from the bus) by using a relatively small internal capacitor to maintain the inter-integrated circuit start/stop control 236 in an active state. Once a stop condition is detected, one or more switches to the load capacitors (such as capacitors 228 and 538 as discussed below with reference to FIG. 5) can be closed to provide power to the entire inter-integrated circuit slave 230 such that the entire device is restored to full operation.

FIG. 3 is a timing diagram illustrating a bus system incorporating combined power and control functions in accordance with preferred embodiments of the disclosure. Timing diagram 300 includes switch signal 302, serial data (SDA) signal 304, and serial clock (SCL) signal 306. Time period 310 includes a start condition in which the inter-integrated circuit bus (such as inter-integrated circuit bus 220) transitions from a quiescent mode to an active mode. During time period 310, the serial data (SDA) signal transitions low, which signals the start of a bus communication during the active period. In response, the switch signal 302 is pulled down to a low voltage, which opens switch S1. When switch S1 is opened, the capacitor used to store charge (such as capacitor 228) is isolated (decoupled) from the serial data (SCL) signal 306, and is (and/or remains) coupled to the circuit power for the inter-integrated circuit slave (such as inter-integrated circuit slave 230).

During time period 320, the inter-integrated circuit bus continues in the active mode until the completion of the bus communication. During the active mode, the serial clock (SCL) signal 306 signals the times at which the information in the serial data (SDA) signal 304 is to be read. Because the function of the serial data changes over the time period 320, the toggling of the serial clock represents changes in the state function used to interpret the serial clock (SCL) signal 306. Accordingly, the serial clock (SCL) signal 306 is monitored (for example, by the inter-integrated circuit start/stop control 236) to determine the completion of the bus communication.

Time period 330 includes an end condition in which the inter-integrated circuit bus transitions from the active mode to the quiescent mode. When the serial clock (SCL) signal 306 indicates completion of the bus communication (such as by transitioning to the final high state immediately before the start of the time period 330), the serial data (SDA) signal 304 is also brought to a high state (as "pulled up" by a pull-up resistor). The switch signal 302 is asserted after the rise of the serial data (SDA) signal 304, which couples the power storage capacitor to the inter-integrated circuit bus power through the pull-up resistor. The inter-integrated circuit bus remains in the quiescent mode until the start of the next bus communication, which provides time for charging the storage capacitor. The degree to which the storage capacitor is charged is discussed more fully with respect to FIG. 4.

FIG. 4 is a timing diagram illustrating the charging of a bus system incorporating combined power and control functions in accordance with preferred embodiments of the disclosure. Timing diagram 400 includes charging signal 408, switch signal 302, serial data (SDA) signal 304, and serial clock (SCL) signal 306. During time period 410, the serial data (SDA) signal transitions low, which signals the start of a bus communication during the active period. In response, the switch signal 302 is pulled down to a low voltage, which causes switch S1 to be opened.

When switch S1 is opened, the capacitor used to store charge (such as capacitor 228) is isolated (decoupled) from the serial data (SCL) signal 306, and is (and/or remains) coupled to the circuit power for the inter-integrated circuit slave (such as inter-integrated circuit slave 230). As the inter-integrated circuit slave expends power (due to operation of the electrical circuits of the inter-integrated circuit slave), the voltage level of the storage capacitor declines (as illustrated by charging signal 408).

During time period 420, the inter-integrated circuit bus continues in the active mode until the completion of the bus communication. As indicated by charging signal 408, the voltage level of the storage capacitor continues declining until the completion of the bus communication. Accordingly, the size of the storage capacitor, the value of the pull-up resistor(s) (which are specified by the inter-integrated circuit system bus standard), and the length of the quiescent period (during which charging of the storage capacitor occurs) are considered to ensure that the inter-integrated circuit slave has enough power to remain active during the active period (unless being reset, as discussed above with respect to FIG. 2, and further below).

During time period 430 the inter-integrated circuit bus transitions from the active mode to the quiescent mode. The switch signal 302 is asserted after the rise of the serial data (SDA) signal 304, which (at time period 440) couples the power storage capacitor to the inter-integrated circuit bus power through the pull-up resistor. The inter-integrated circuit bus remains in the quiescent mode until the start of the next bus communication, which begins at time period 450.

The length of time period 440 is controlled by the inter-integrated circuit master, which selects the time at which the next bus communication is initiated. If a reset of the inter-integrated circuit slave is not desired, the time at which the next bus communication is initiated is selected to provide sufficient time for charging the storage capacitor so that the inter-integrated circuit slave has access to sufficient power that a reset (due to a low power condition, for example) is not forced or encountered. Thus, for example, the power stored by the storage capacitor (as represented by charging signal 408) does not fall to a level within time period 460 such that a reset is forced (before time period 470, at which time the storage capacitor is once again recharged).

If a reset of the inter-integrated circuit slave is desired, the time at which the next bus communication is initiated is selected to provide insufficient time for charging the storage capacitor so that the inter-integrated circuit slave does not have access to sufficient power that a reset (due to a low power condition, for example) is forced during the next active period. Thus, for example, the power stored by the storage capacitor (as represented by charging signal 408) is expected to fall to a level within time period 460 such that a reset is forced (before time period 470, at which time the storage capacitor is once again recharged). Accordingly, the inter-integrated circuit slave can be powered and a control state (such as reset) that is not defined by the inter-integrated circuit bus standard is controllable without requiring pins (or other kinds of terminals) on the inter-integrated circuit slave.

FIG. 5 is a logic diagram illustrating a bus system incorporating a two-capacitor system having combined power and control functions in accordance with preferred embodiments of the disclosure. Bus system 500 is illustrated as an inter-integrated circuit bus system having an inter-integrated circuit master 210, an inter-integrated circuit bus 220, and an inter-integrated circuit slave 530. Inter-integrated circuit master 210 is typically arranged on a first substrate 216, from which power for the inter-integrated circuit master 210 is provided.

Inter-integrated circuit master 210 is coupled to an inter-integrated circuit bus 220 via the serial clock line (SCL) and a serial data (SDA) line in accordance with the inter-integrated circuit bus standard. The serial clock line (SCL) and a serial data (SDA) line are normally arranged in an open drain configuration and are respectively coupled to system power via pull-up resistors 212 and 214. The inter-integrated circuit bus 220 is typically arranged between a first substrate 216 and a second substrate 542 to couple communications from circuits formed in differing substrates.

The inter-integrated circuit slave 530 is typically arranged on the second substrate 542 and is a pin-limited circuit such that total number of pins, terminals, I/O pads, and the like is minimized to conserve resources. In accordance with the present disclosure, inter-integrated circuit slave 530 derives power for the active circuitry of the inter-integrated circuit slave 530 from one or more bus signals. Additionally, the amount of power provided by the one or more bus signals is used to control resetting of the inter-integrated circuit slave 530 (which allows the inter-integrated circuit slave 530 to not have a dedicated reset pin).

In operation, the inter-integrated circuit start/stop control 236 of the inter-integrated circuit slave 236 is arranged to determine whether the inter-integrated circuit bus 220 is operating in an active mode or a quiescent mode. During the quiescent mode, the power control manager 540 (which is a power control manager such as power control manager 136) is arranged to charge capacitor 228 and capacitor 538. During the active mode, the capacitor 228 is arranged to supply power to the active circuitry of the inter-integrated circuit slave 530. The capacitor 538 can be physically mounted on the substrate 542 or formed within substrate 542 such that an I/O (input and/or output) pad, pin, or terminal is not necessarily required to couple the capacitor to the power input of the inter-integrated circuit slave 530.

In the quiescent mode (e.g., when no bus communications are currently active), communication sense 232 unit senses that a bus line (such as SCL, as illustrated in FIG. 2) is "pulled" high (for example, by resistors 212 and/or 214. Closing switch S1 couples power from the power supply through the pull-up resistors 212 and/or 214 to the capacitor 228 and capacitor 538. The pull-up resistors limit the instantaneous current flow to the capacitor 228 and the capacitor 538, which lowers electromagnetic interference (EMI), ground bounce, instantaneous power requirements, and the like.

Switches S1 and S2 are arranged to be actuated (e.g., open and closed) by switch control 534. In response to a determination that the bus line is high (and the bus is in quiescent mode), switch control 534 is arranged to close switches S1 and S2. Switch control 534 is also arranged to close switches S1 and S2 in response to an indication from inter-integrated circuit start/stop control 236 that the bus is entering (or is in) the quiescent mode. Likewise the inter-integrated circuit slave 530 optionally contains state logic (including latches, clocks, counters, state machines, and the like) that are used to control the closing of switch S1 and S2.

Switch S1 and S2 are opened to decouple the (stored charge of the) capacitor from the signal line to permit normal communications over the signal line during the active mode. As discussed above, the amount of power provided by the one or more bus signals is used to control resetting of the inter-integrated circuit slave 530 (which allows the inter-integrated circuit slave 530 to not have a dedicated reset pin). Power control unit 534 is arranged to monitor the power (e.g., by measuring the voltage) of capacitor 228. When the available power (e.g., measured as instantaneous voltage) drops down to a threshold that defines (or is maintained in) a "brown out" condition, power control unit 534 is arranged to assert a reset signal for resetting the inter-integrated circuit slave 530. However, the capacitor 228 might not have sufficient power to accomplish the reset and/or other functions desired as a result of the forced "brown-out" condition. To provide the additional power, switch control 534 directs that switch S2 be closed such that the charge stored by capacitor 538 can be applied after the circuit enters the brown-out condition. Thus the inter-integrated circuit slave 530 can be reset externally and have sufficient power to attain and/or maintain a desired condition without requiring the use of dedicated pin (or other type of terminal) receive an external reset command or to provide power.

Figure 6:
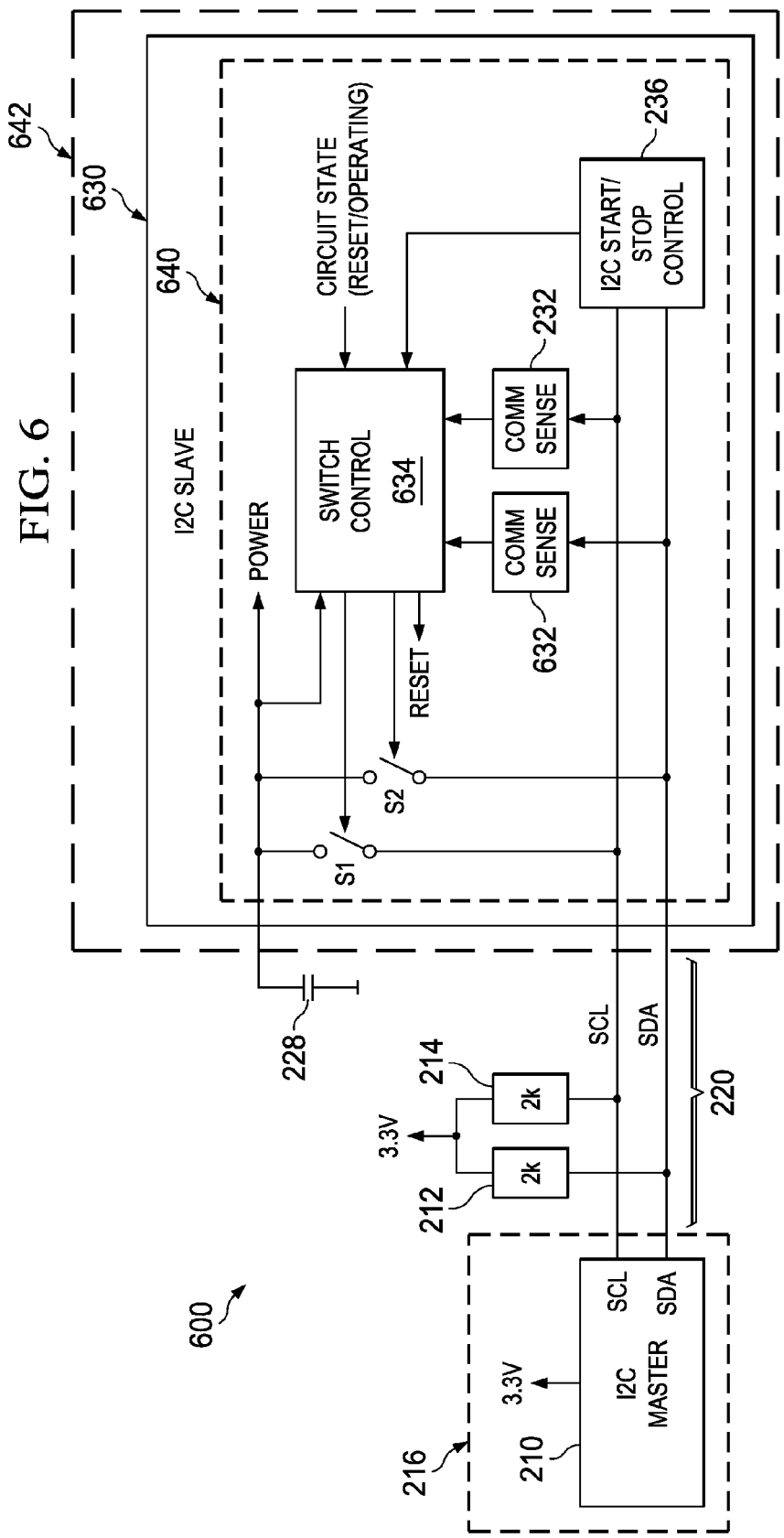
FIG. 6 is a flow diagram illustrating a bus system incorporating a two-signal line charging system having combined power and control functions in accordance with preferred embodiments of the disclosure.

FIG. 6 is a flow diagram illustrating a bus system incorporating a two-signal line charging system having combined power and control functions in accordance with preferred embodiments of the disclosure. Bus system 600 is illustrated as an inter-integrated circuit bus system having an inter-integrated circuit master 210, an inter-integrated circuit bus 220, and an inter-integrated circuit slave 630.

Inter-integrated circuit master 210 is coupled to an inter-integrated circuit bus 220 via the serial clock line (SCL) and a serial data (SDA) line in accordance with the inter-integrated circuit bus standard. The inter-integrated circuit bus 220 is typically arranged between a first substrate 216 and a second substrate 642 to couple communications from circuits formed in differing substrates.

In accordance with the present disclosure, inter-integrated circuit slave 630 derives power for the active circuitry of the inter-integrated circuit slave 630 from one or more bus signals. Additionally, the amount of power provided by the one or more bus signals is used to control resetting of the inter-integrated circuit slave 630 (which allows the inter-integrated circuit slave 630 to not have a dedicated reset pin).

In operation, the inter-integrated circuit start/stop control 236 of the inter-integrated circuit slave 630 is arranged to determine whether the inter-integrated circuit bus 220 is operating in an active mode or a quiescent mode. During the quiescent mode, the power control manager 640 (which is a power control manager such as power control manager 136) is arranged to charge capacitor 228 (and optionally another capacitor—such as capacitor 538—coupled in parallel with capacitor 228). During the active mode, the capacitor 228 is arranged to supply power to the active circuitry of the inter-integrated circuit slave 630.

In the quiescent mode (e.g., when no bus communications are currently active), communication sense 232 unit and communication sense unit 632 are respectively arranged to determine whether the serial clock signal and the serial data lines are "pulled" high (for example, by resistors 214 and 212, respectively. Closing switch S1 and switch S2 couples power from the power supply through the pull-up resistors 212 and 214 to the capacitor 228, which doubles the charging rate achievable through a single bus line. In an alternate embodiment, switch S1 is coupled in series with capacitor 228 and switch S2 is coupled in series with a capacitor (such as capacitor 538) that is arrange to supply power during a brown-out condition (which allows the calculations and software used to determine the brown-out conditions to not have to take the charging of the second capacitor into the determinations).

Switches S1 and S2 are arranged to be actuated (e.g., open and closed) by switch control 634. In response to a determination that the bus line is high (and the bus is in quiescent mode), switch control 634 is arranged to close switches S1 and S2. Switch control 634 is also arranged to close switches S1 and S2 in response to an indication from inter-integrated circuit start/stop control 236 that the bus is entering (or is in) the quiescent mode. Likewise the inter-integrated circuit slave 630 optionally contains state logic (including latches, clocks, counters, state machines, and the like) that are used to control the closing of switch S1 and S2.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A power control device, comprising:
   a substrate;
   a first switch that is formed in the substrate to selectively couple a first signal line to a first lead of a first capacitor that is coupled to a first rail of a power distribution system of the substrate; and
   a switch control that is formed in the substrate and is associated with the first switch, the switch control to couple the first signal line to the first lead of the first capacitor in response to a determination that a second signal line transitions from a logical low state to a logical high state while the first signal line is in the logical high state, to decouple the first signal line from the first lead of the capacitor in response to a determination that the second signal line transitions from the logical high state to the logical low state while the first signal line is in the logical high state;
   wherein the first capacitor supplies power to an inter-integrated circuit slave when the first switch decouples the first lead of the first capacitor from the first signal line.

2. The device of claim 1, wherein the first signal line is coupled to a power source that is not coupled to a dedicated power pin of the first substrate.

3. The device of claim 2, wherein the first signal line is coupled to the power source via a current limiting device.

4. The device of claim 3, wherein the current limiting device is a resistor that is arranged externally to the first substrate.

5. The device of claim 1, wherein the first signal line is a clock line and the second signal line is a data line.

6. The device of claim 5, wherein the first signal line transitions between the logical high state and the logical low state after the second signal line transitions from the logical high state to the logical low state while the first signal line is in the logical high state, and is maintained at the logical high state after the second signal line transitions from the logical low state to the logical high state while the first signal line is in the logical high state.

7. The device of claim 6, wherein the determination that the second signal line transitions from the logical low state to the logical high state while the first signal line is in the logical high state defines a quiescent mode, and the determination that the second signal line transitions from the logical high state to the logical low state while the first signal line is in the logical high state defines an active mode.

8. A reduced-pin bus system, comprising:
   a bus having a first signal line that is coupled to a bus power supply through a current limiting device;
   a master unit to initiate communications across the bus, the communications transmitted during an active period of the bus and the communications quiescent during a quiescent period of the bus; and
   an inter-integrated circuit slave to couple power from the first signal line to a capacitor during the quiescent period of the bus, the quiescent period of the bus to start when a second signal line transitions from a logical low state to a logical high state while the first signal line is in the logical high state and to end when the second signal line transitions from the logical high state to the logical low state while the first signal line is in the logical high state, and the inter-integrated circuit slave to consume power from the capacitor during the active period of the bus, the active period of the bus to start when the second signal line transitions from the logical high state to the logical low state while the first signal line is in the logical high state and to end when the second signal line transitions from the logical low state to the logical high state while the first signal line is in the logical high state.

9. The system of claim 8, wherein the inter-integrated circuit slave is to change an operating condition in response to a power level of the capacitor dropping below a threshold.

10. The system of claim 8, wherein the inter-integrated circuit slave is to reset in response to a power brown-out condition of the slave unit.

11. The system of claim 10, wherein the master unit is to cause the inter-integrated circuit slave to enter the brown-out condition by initiating communications across the bus to shorten the quiescent periods such that the capacitor does not store sufficient charge during the quiescent periods to avoid the brown-out condition.

12. The system of claim 11, further including a second capacitor to store charge to supply power to the inter-integrated circuit slave during the brown-out condition.

13. A method, comprising:
- limiting current applied to a first signal line that is coupled to a circuit on a first substrate;
- charging a capacitor by coupling the first signal line to a first lead of the capacitor in response to a determination that a second signal line transitions from a logical low state to a logical high state while the first signal line is in the logical high state;
- decoupling the first signal line from the first lead of the capacitor in response to a determination that the second signal line transitions from the logical high state to the logical low state while the first signal line is in the logical high state; and
- using the charge stored in the capacitor to supply power to an inter-integrated circuit slave when the first lead of the capacitor is decoupled from the first signal line.

14. The method of claim 13, including resetting the inter-integrated circuit slave when the charge in the capacitor falls below a threshold.

15. The method of claim 14, including controlling when the second signal line transitions from the logical high state to the logical low state while the first signal line is in the logical high state, such that the capacitor stores sufficient charge to avoid the charge in the capacitor falling below the threshold.

16. The method of claim 13, including controlling when the second signal line transitions from the logical high state to the logical low state while the first signal line is in the logical high state, such that the capacitor stores insufficient charge and the charge in the capacitor intentionally falls below a threshold.

17. The method of claim 16, wherein current applied to a first signal line is limited by a pull-up resistor that is coupled between the first signal line and a bus power supply that is not coupled to a dedicated power terminal of the first substrate.

* * * * *